(12) United States Patent
Buchman (10) Patent No.: US 9,672,222 B1
(45) Date of Patent: Jun. 6, 2017

(54) WRITE-THROUGH BUFFER CACHE FOR WRITE-ABLE FILE SYSTEM THAT UTILIZES DIFFERENCING DISK TO PRESERVE READ-ONLY DATA

(71) Applicant: EMC IP Holding Company LLC, Hopkinton, MA (US)

(72) Inventor: Matthew Buchman, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 523 days.

(21) Appl. No.: 14/104,982

(22) Filed: Dec. 12, 2013

(51) Int. Cl.
*G06F 17/30* (2006.01)
(52) U.S. Cl.
CPC .............. *G06F 17/30233* (2013.01)
(58) Field of Classification Search
CPC ................................................ G06F 17/30067
USPC ....................................... 707/609, 610, 822
See application file for complete search history.

(56) References Cited

U.S. PATENT DOCUMENTS

| 6,374,268 B1* | 4/2002 | Testardi | G06F 17/30067 707/822 |
| 2005/0080823 A1* | 4/2005 | Collins | G06F 17/30176 707/2 |
| 2012/0084775 A1* | 4/2012 | Lotlikar | G06F 9/45558 718/1 |
| 2015/0106802 A1* | 4/2015 | Ivanov | G06F 9/45558 718/1 |

* cited by examiner

*Primary Examiner* — Chelcie Daye
(74) *Attorney, Agent, or Firm* — Van Pelt, Yi & James LLP (57) ABSTRACT

A write instruction which affects original data is received via a virtual file system; the original data is read-only on a remote device. The original data is received from the remote device and the write instruction is applied to the original data in order to obtain changed data. The changed data is stored in a buffer in the virtual file system. The changed data is copied from the buffer to a differencing file, where deletion of the changed data from the buffer is independent of completion of copying from the buffer to the differencing file.

22 Claims, 9 Drawing Sheets

Buffer Cache or Differencing File

FIG. 9

WRITE-THROUGH BUFFER CACHE FOR WRITE-ABLE FILE SYSTEM THAT UTILIZES DIFFERENCING DISK TO PRESERVE READ-ONLY DATA

BACKGROUND OF THE INVENTION

Some systems provide the ability to modify read-only data while preserving an original copy of the data. For example, if a backup application is running, then the data being backed up must often be "frozen" (e.g., by making it read-only) in order to properly perform the backup. However, if modification of the read-only data (without touching an original copy of the data) is permitted, then other applications can run simultaneously while the backup application is running. Performance improvements in such systems would be desirable, for example so that the application which is running at the same time as the backup application is able to run faster. Oftentimes, there is a user interacting with the application and it is undesirable to keep a user waiting.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
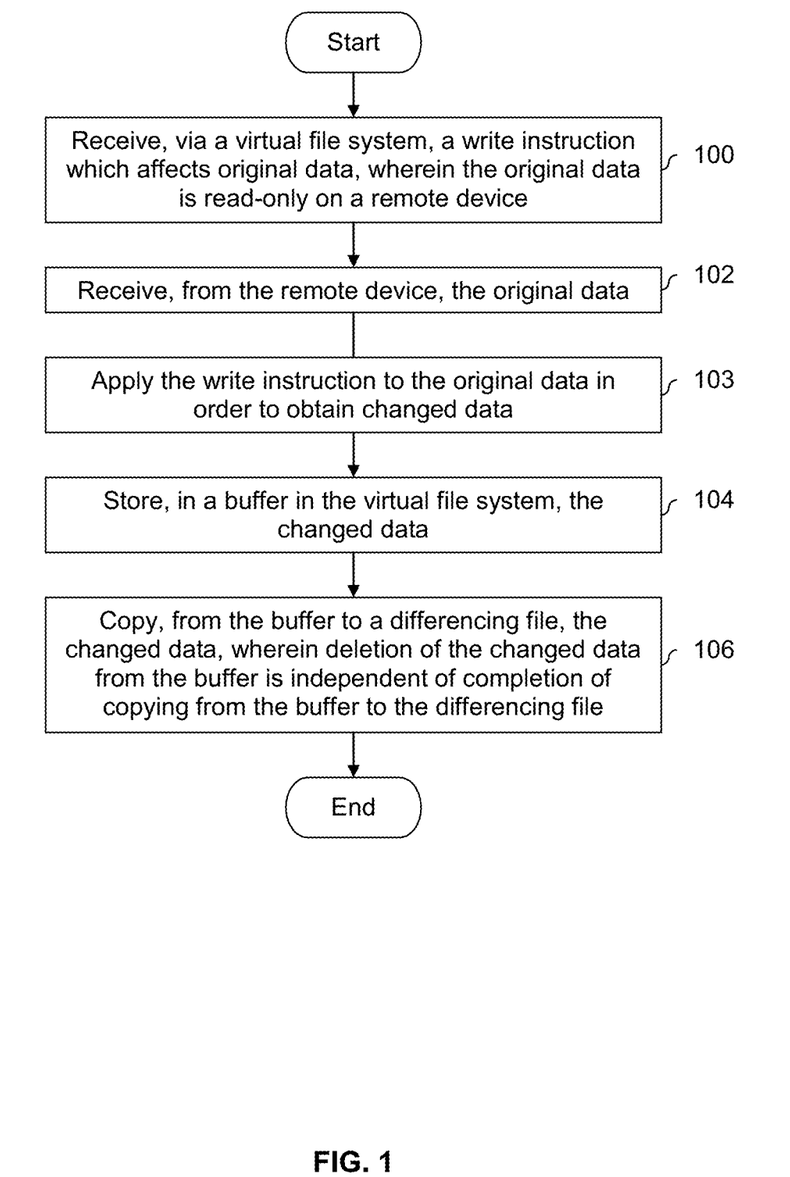
FIG. 1 is a flowchart illustrating an embodiment of a process for storing changed data in a buffer in a virtual file system.

FIG. 1 is a flowchart illustrating an embodiment of a process for storing changed data in a buffer in a virtual file system. In the example shown, the process is performed by a device which includes a virtual file system. With a virtual file system, an application running on the virtual file system believes that data (e.g., application data created by an application) is stored locally (e.g., on local storage on the local device) when in fact most of the data may be stored on a remote device.

At 100, a write instruction which affects original data is received via a virtual file system, wherein the original data is read-only on a remote device. For example, an application running on top of a virtual file system (e.g., with an I/O subsystem between the two) may issue the write instruction and the write instruction is received via the virtual file system.

The original data on the remote device is a protected copy (e.g., the copy of the original data on the remote device is read-only), so in order to perform the write instruction on the original data (in this example at least), the original data is obtained from the remote device. As such, at 102, the original data is received from the remote device. In some embodiments, the original data received at step 102 is received in "chunks" (e.g., blocks). In some such embodiments, only those blocks affected by the write instruction are received at 100. This, for example, minimizes the amount of information exchanged between a remote device (on which the original data is stored) and the local device (on which the changes to the original data are stored).

At 103, the write instruction is applied to the original data in order to obtain changed data. For example, if the application which issued the write instruction is a word processing application, then the write instruction may be to insert some new content into a portion of a document, delete some content in the document, etc. Database transaction replay is another example. An application accesses a database and transaction log files on the virtual file system. The application inspects the transaction log files and applies (e.g., writes) transactions to the database file to make it transactionally consistent.

Figure 2:
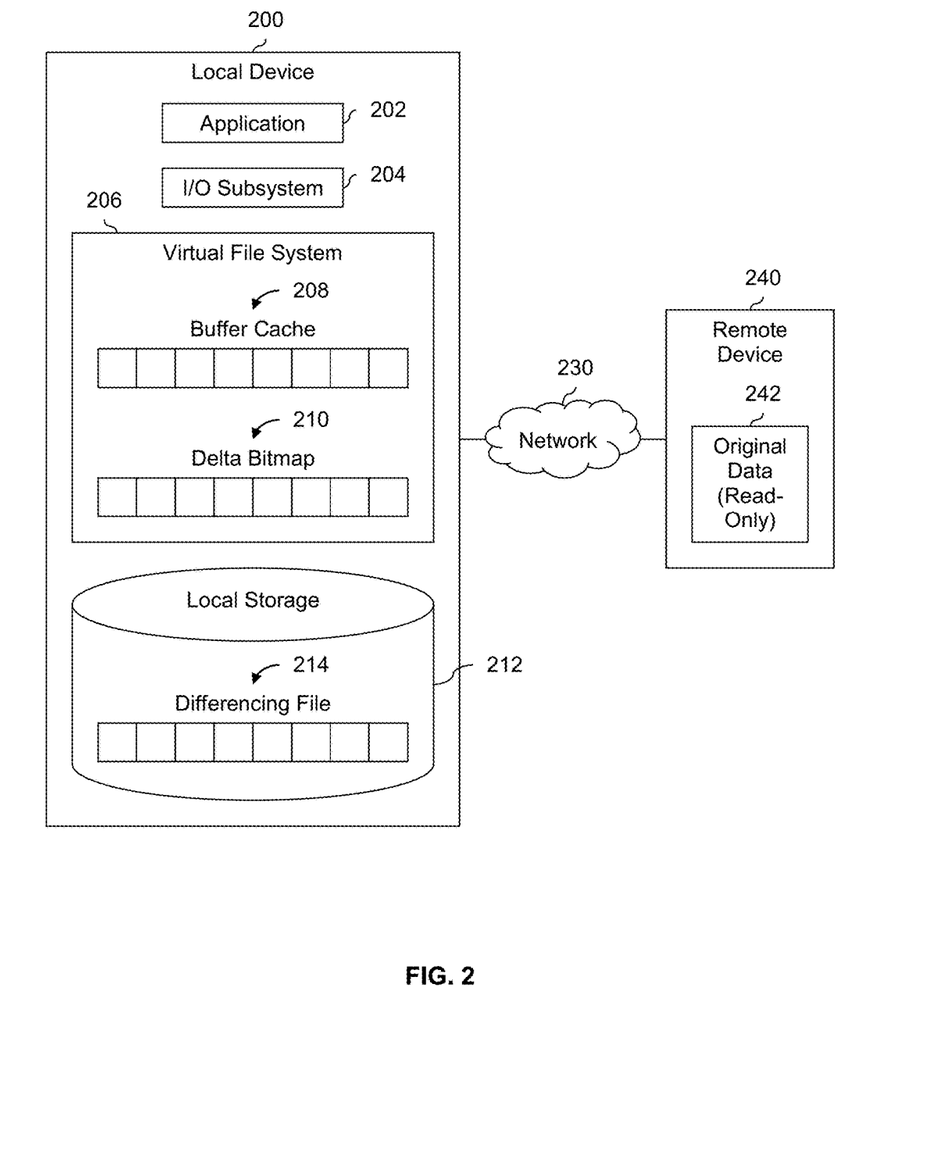
FIG. 2 is a diagram illustrating an embodiment of a system which stores changed data in a buffer in a virtual file system.

At 104, the changed data is stored in a buffer in the virtual file system. At 106, the changed data is copied from the buffer to a differencing file, wherein deletion of the changed data from the buffer is independent of completion of copying from the buffer to the differencing file. One of the functions of the buffer in the virtual file system is to store the changed data until the changed data can be copied to the differencing file. Differencing file 214 is where changed data associated with original data 242 is stored on a relatively long term basis (e.g., until the permissions for original data 242 change from read only to writable and the changes stored in differencing file 214 can be merged into original data 242). However, completion of copying at 106 does not (e.g., automatically) trigger deletion of the changed data from the buffer in the virtual file system. Keeping the changed data around in the buffer in the virtual file system enables the changed data to more quickly be available if a subsequent access instruction associated with the changed data request is received from the application. Some examples of this are described in further detail below. In some embodiments, there is some pre-existing process or agent which copies (e.g., changed) data from the buffer in the virtual file system to the differencing file and this pre-existing process or agent is utilized at step 106.

In one example, the reason why the original data on the remote device is read-only is that the original data on the remote device is being backed up and must be frozen until the backup is complete. In some such cases, once the backup is complete, the changed data (e.g., on the local device) is merged with the original data (e.g., on the remote device) so that the data on the remote device is up to date. In one example, EMC NetWorker® is used to perform the backup. Note that at least in some cases, the write instruction received at step 100 is from some other application besides a backup application (e.g., it is another application which is running simultaneously with the backup application).

FIG. 2 is a diagram illustrating an embodiment of a system which stores changed data in a buffer in a virtual file system. The system shown in this figure is one embodiment of a system which performs the process of FIG. 1. Naturally, in some other embodiments some other system performs the process of FIG. 1.

Remote device 240 includes original data 242 which is read-only. In other words, original data 242 on remote device 240 cannot be modified. Local device 200 and remote device 240 are connected together via network 230. Local device 200 includes application 202 which is running on I/O subsystem 204 which in turn is running on virtual file system 206. To continue the example from above, application 202 may be a word processing application which is running at the same time some backup application (not shown) is backing up original data 242 on remote device 240.

Virtual file system 206 includes buffer cache 208. Changed data (not shown) is stored in buffer cache 208. From buffer cache 208, changed data is copied to differencing file 214 which is located on local storage 212 outside of virtual file system 206. Deletion of a given piece of changed data from buffer cache 208 is independent of completion of copying to differencing file 214. For example, changed data is deleted from buffer cache 208 when buffer cache 208 starts getting full and space is needed.

In some embodiments, other information (e.g., in addition to changed data) is stored in a buffer cache. For example, buffer cache 208 may also be used to store original data (i.e., unmodified from the version on remote device 240), which may in turn be used to improve performance (e.g., when application 202 reads original data that is already in buffer cache then it saves a read from remote device 240).

Virtual file system 206 also includes delta bitmap 210 which tracks which portions (e.g., blocks or partial blocks) of original data 242 should be obtained from which location. For example, delta bitmap 210 may include a bitmap (or some other value) indicating where each block should be obtained from. For those changed blocks which should be obtained from differencing file 214 or buffer cache 208 (e.g., as indicated by delta bitmap 210), the appropriate location in differencing file 214 or buffer cache 208 may be recorded in delta bitmap 210 (not shown).

In some embodiments, a delta bitmap is permitted to expand if more space is needed (e.g., so that no information needs to be evicted from a delta bitmap for lack of space). For example, virtual file system 206 may track changes locally to original data 242 while original data 242 is being backed up by some backup application (not shown). In such applications, it is undesirable for delta bitmap 210 to be a fixed size since some changes to original data 242 may be irretrievably lost.

In one example, if the value for a given block is "R" (e.g., for "remote device), then that block should be obtained from remote device 240 (e.g., because that block has not been changed and it is not stored in buffer cache 208 or differencing file 214). If the value in delta bitmap 210 for a given block is "D" (e.g., for "differencing file"), then that block is obtained from differencing file 214 (e.g., because that block has been modified but it is not stored in buffer cache 208, for example because space was needed in buffer cache 208). If, for a given block, the value in delta bitmap 210 is "B" (e.g., for "buffer cache"), then that block is obtained from buffer cache 208 (e.g., because that block has been modified, it is faster to obtain from buffer cache 208 compared to differencing file 214 and/or because that changed block has not yet been migrated to differencing file 214). Naturally, numeric values (e.g., 0, 1, or 2) may alternatively be used.

In some embodiments (e.g., where most of the blocks are expected to be obtained from remote device 242), if no information is stored in delta bitmap 210 for a given block, then that block should be obtained from the remote device (e.g., as a default).

The following figure shows a more detailed example of the process of FIG. 1 being performed by the system shown in FIG. 2.

Figure 3:
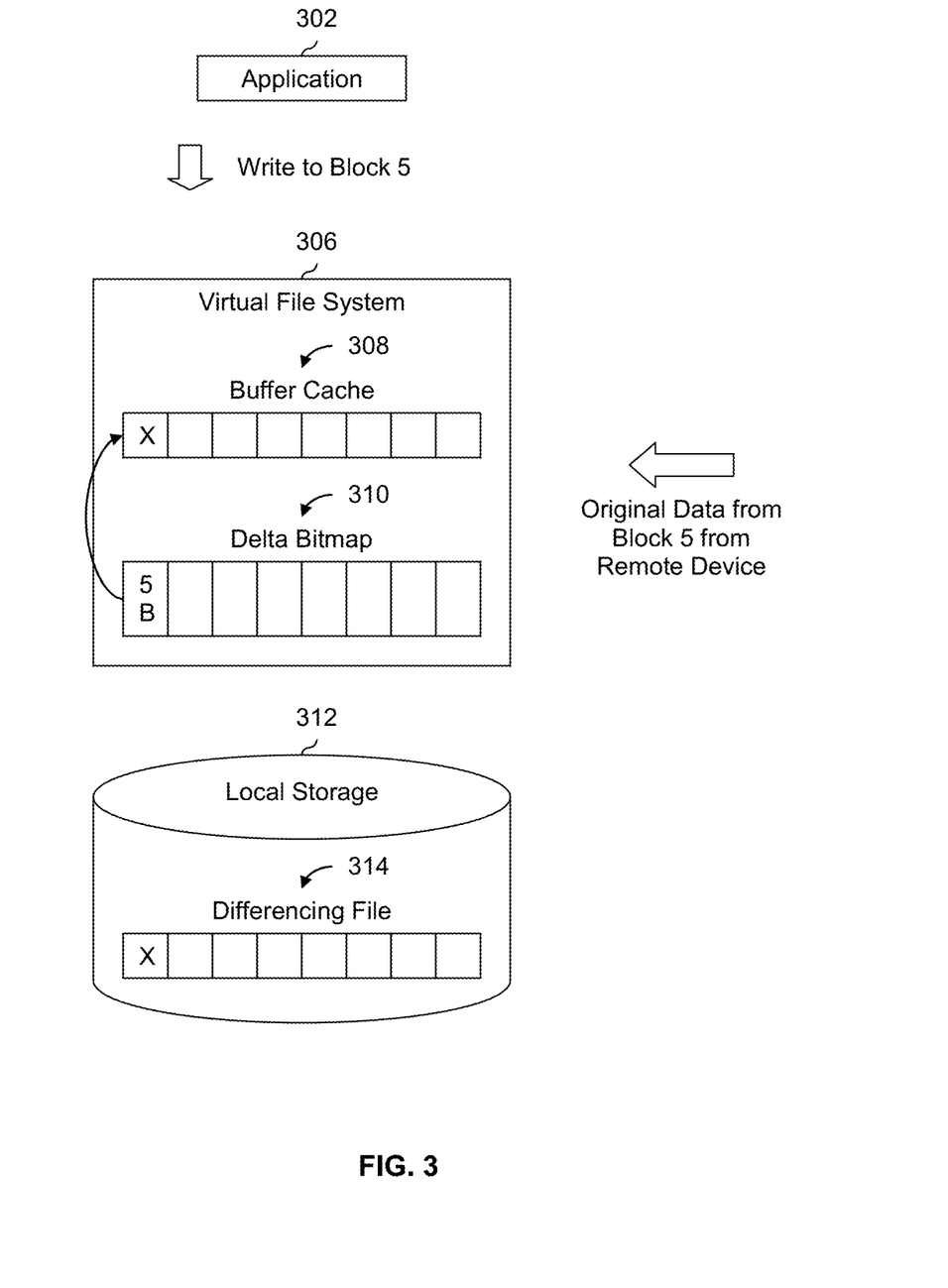
FIG. 3 is a diagram illustrating an embodiment of a system which stores changed data in a buffer in a virtual file system.

FIG. 3 is a diagram illustrating an embodiment of a system which stores changed data in a buffer in a virtual file system. For brevity, some elements shown in FIG. 2 are not shown herein. Application 302 issues an instruction to write to block 5 in some original, read-only data on a remote device (not shown). This is one example of a write instruction which is received at step 100 in FIG. 1.

The original data from block 5 is received by virtual file system 306 from the remote device (not shown). This is one example of original data which is received at step 102 in FIG. 1.

When the write instruction is applied to the received original data, the resulting data is "X" and data "X" (i.e., the original data with the write instruction applied) is stored in buffer cache 208. This is one example of generating changed data at step 103 in FIG. 1 and storing changed data at step 104 in FIG. 1. Note that delta bitmap 310 indicates that block should be obtained from buffer cache 308 (e.g., the "5B" stored by delta bitmap 310 indicates that the (changed) data for block 5 should be obtained from buffer cache 308).

The changed data is copied from buffer cache 308 to differencing file 314. Note, for example, that differencing file 314 includes data "A". This is one example of copying at step 106. Note that even after data "X" is copied from buffer cache 308 to differencing file 314, data "X" is maintained in buffer cache 308 (e.g., so long as there is space in buffer cache 308). To put it another way, migration from buffer cache 308 to differencing file 314 does not (e.g., automatically) trigger deletion of data "X" from buffer cache 308.

Figure 4:
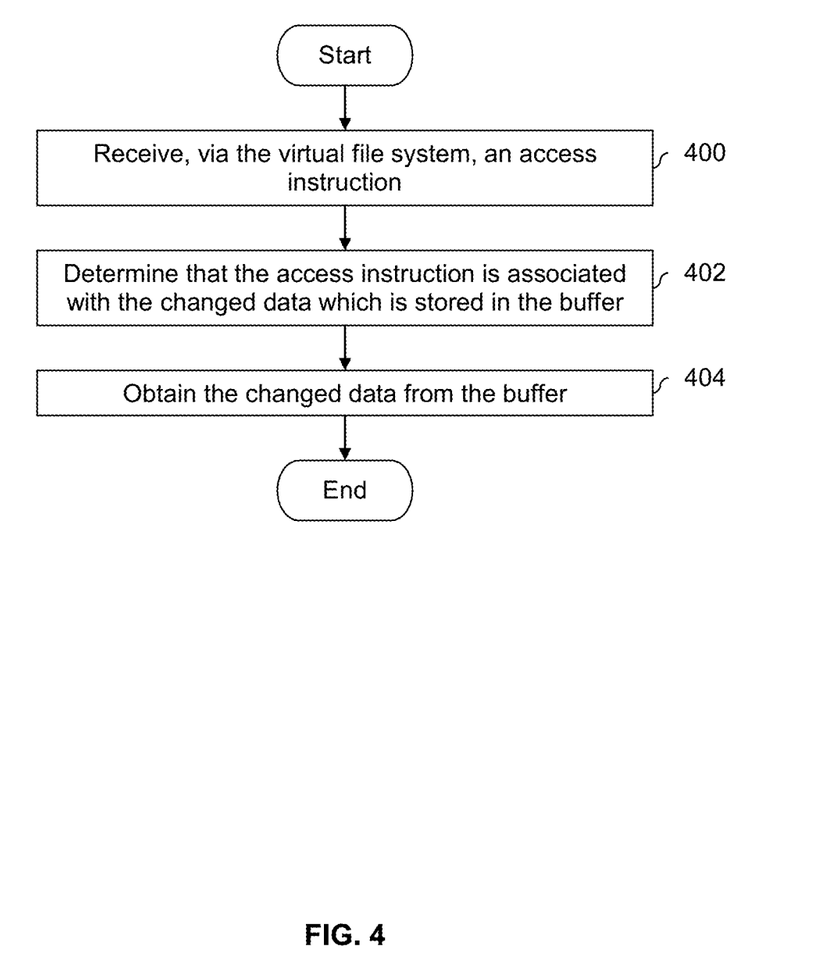
FIG. 4 is a flowchart illustrating an embodiment of an instruction which takes advantage of changed data stored in a buffer in a virtual file system.

FIG. 4 is a flowchart illustrating an embodiment of an instruction which takes advantage of changed data stored in a buffer in a virtual file system. In some embodiments, the process of FIG. 4 follows the process shown in FIG. 1. At 400, an access instruction is received via the virtual file system. For example, the access instruction may be either a read instruction or a write instruction.

At 402, it is determined that the access instruction is associated with the changed data which is stored in the buffer. For example, the access instruction may include a block number to be read from or written to. The delta bitmap in the virtual file system may be consulted and an association between the block number and changed data stored in the buffer (e.g., stored at step 104 in FIG. 1) may be located. At 404, the changed data is obtained from the buffer.

Figure 6:
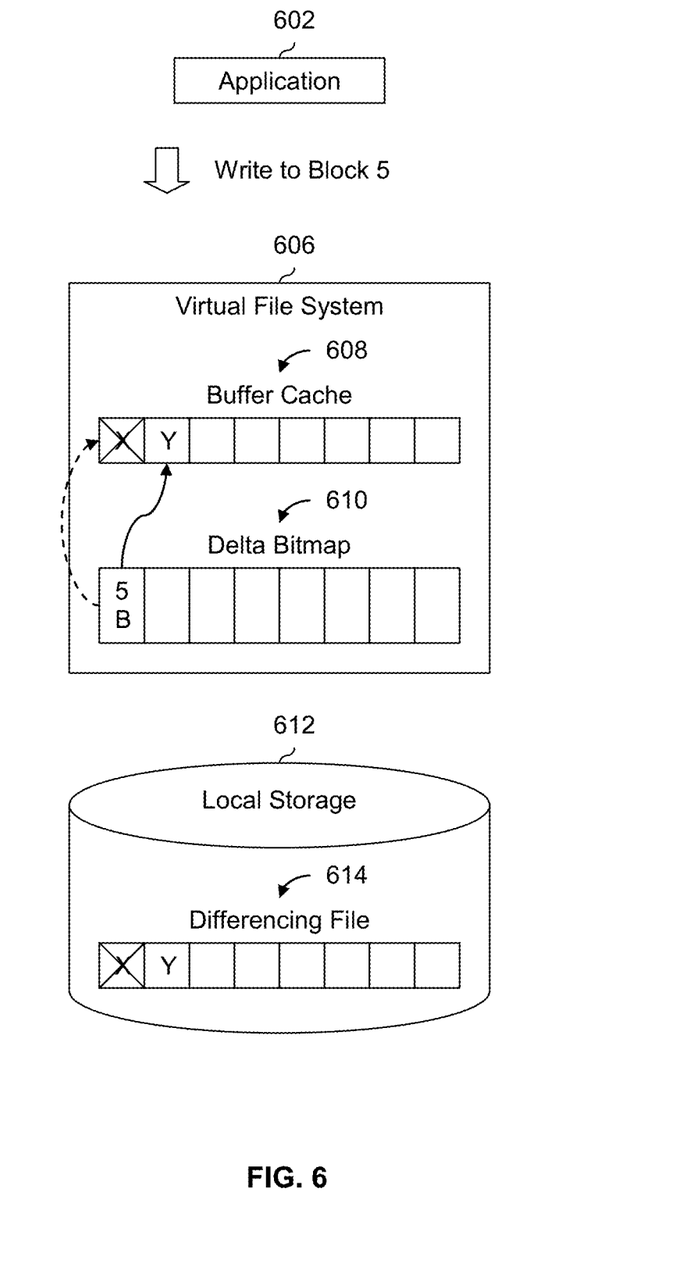
FIG. 6 is a diagram illustrating an embodiment of a changed block stored in a buffer in a virtual file system which is subsequently accessed in response to a write instruction.

Depending upon the type of access instruction received at step 400, a variety of subsequent steps may be performed. For example, if the access instruction is a read instruction, then the changed data obtained at step 404 (and any other requested data) may be returned to the application. Or, if the access instruction is a write instruction, then the write instruction may be performed on the obtained changed data. Note that the buffer in the virtual file system, the delta bitmap in the virtual file system, and the differencing file may be updated as well (e.g., similar to steps 103, 104, and 106 in FIG. 1). In some embodiments, this scenario is referred to as a write-through (e.g., an access instruction received at step 400 is a write instruction which affects changed data stored in both a buffer cache and a differencing file and the further changed data is written to both locations). An example of this is shown in FIG. 6.

Obtaining the changed data from a buffer in a virtual file system (e.g., in response to some second or subsequent instruction) may be faster than obtaining that same information from a differencing file. Although the differencing file may be on local storage (and thus is also on the local device), it takes longer to access local storage than the buffer in virtual file system (e.g., the local storage may be NAND Flash or a hard disk drive with relatively slow turnaround times and the buffer in the virtual file system may comprise allocated memory which has faster turnaround times). Naturally, in some cases, the access instruction is determined to be associated with data that is limited to just the remote device and/or just the differencing file. If so, the performance improvement offered by the buffer cache (i.e., which stores original data with a write instruction applied) is not apparent.

Figure 5:
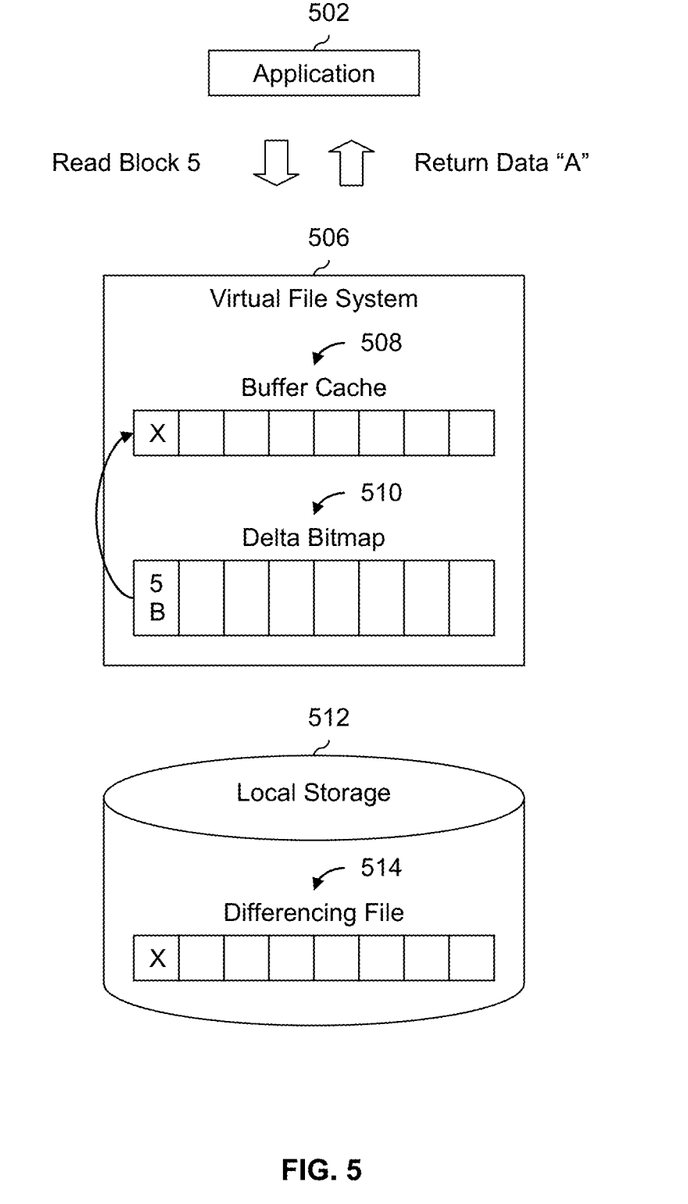
FIG. 5 is a diagram illustrating an embodiment of a changed block stored in a buffer in a virtual file system which is subsequently accessed in response to a read instruction.

FIG. 5 is a diagram illustrating an embodiment of a changed block stored in a buffer in a virtual file system which is subsequently accessed in response to a read instruction. In the example shown, the process of FIG. 4 is performed on the system shown in FIG. 3 where the received access instruction is a read instruction. In the example shown, a read instruction is received by virtual file system 506 from application 502. The read instruction encompasses block 5; one or more additional blocks (e.g., in addition to block 5) may be covered by the received read instruction.

Delta bitmap 510 is accessed in order to determine where to obtain the data for block 5. Based on the stored information (i.e., "5B") the data for block 5 is obtained from buffer cache 508. Buffer cache 508 is accessed (e.g., at some location or offset stored in delta bitmap 510) and the data for block 5 (i.e., the data "X") is obtained. Since this is a read instruction, the data "X" is returned to application 502 from virtual file system 506. Naturally, if other blocks are requested, the data associated with those blocks is returned as well (where each block may be obtained from any of buffer cache 508, differencing file 514, or a remote device (not shown) independent of any other block). Note that although a copy of data "X" is stored on differencing file 514, that copy is not accessed since it is faster to access buffer cache 508 on virtual file system 506 instead of going to differencing file 514 which is in local storage 512.

FIG. 6 is a diagram illustrating an embodiment of a changed block stored in a buffer in a virtual file system which is subsequently accessed in response to a write instruction. In the example shown, the process of FIG. 4 is performed on the system shown in FIG. 3 where the received access instruction is a write instruction. In the example shown, a second instruction to write to block 5 (again) is received from application 602 by virtual file system 606. As in the previous example, the second write instruction may encompass additional blocks in addition to block 5.

Delta bitmap 610 is consulted to determine where to obtain the data for block 5. Based on the information stored in delta bitmap 610 (i.e., "5B"), the data for block 5 is obtained from buffer cache 608. At this point in time, delta bitmap 610 points to the location or offset containing data "X" (shown with a dashed line). Data "Y" results from applying the second write instruction to data "X". In other words, data "Y" is the original data with both write instructions applied.

Delta bitmap 610 is then updated to store the location or offset of data "Y" instead of data "X" (e.g., this is shown with an unbroken line from delta bitmap 610 to data "B" in buffer cache 608). Similarly, data "Y" is copied from buffer cache 608 to differencing file 614 on local storage 612 (e.g., note that data "X" in differencing file 614 is crossed out and data "Y" is now included in differencing file 614). For clarity, both data "X" and data "Y" are shown in buffer cache 608 and differencing file 614 in this example. Alternatively, an in-place update may be performed where data "X" is overwritten with data "Y" (i.e., they are located in the same spot or location in buffer cache 608 or differencing file 614 but at different times).

Figure 7:
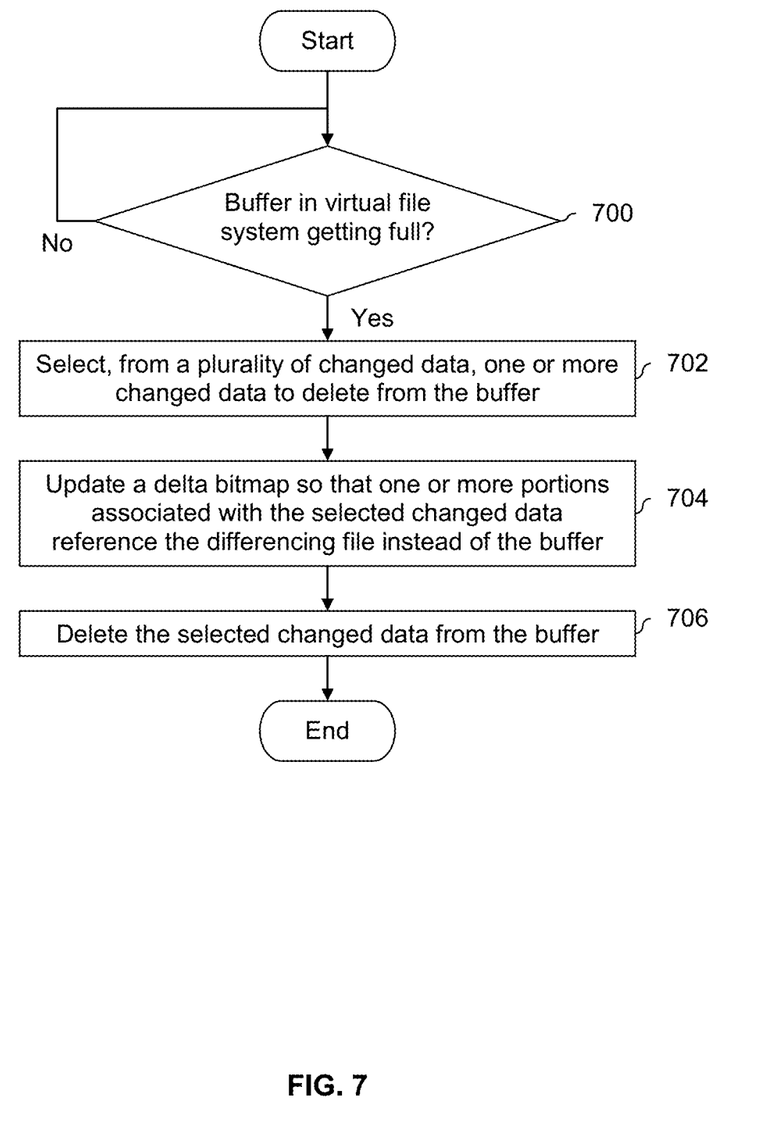
FIG. 7 is a flowchart illustrating an embodiment of a buffer eviction process.

FIG. 7 is a flowchart illustrating an embodiment of a buffer eviction process. This example shows a process to make space in a buffer in a virtual file system, if needed. In some embodiments, this process runs independently of the process shown in FIG. 1.

At 700, it is determined if a buffer in a virtual file system is getting full. For example, if buffer cache 208 in FIG. 2 reaches a certain percentage of occupancy, then the decision at 700 is Yes. If it is determined at 700 that the buffer is getting full, then one or more changed data to delete from the buffer is selected from a plurality of changed data at 702. In some embodiments, a first-in, first-out selection technique is used.

At 704, a delta bitmap is updated so that one or more portions associated with the selected changed data reference the differencing file instead of the buffer. For example, if changed data associated with block 5 is selected for eviction, then a stored value of "5B" in the delta bitmap is changed to "5D" to point to the differencing file. At 706, the selected changed data is deleted from the buffer.

Figure 8:
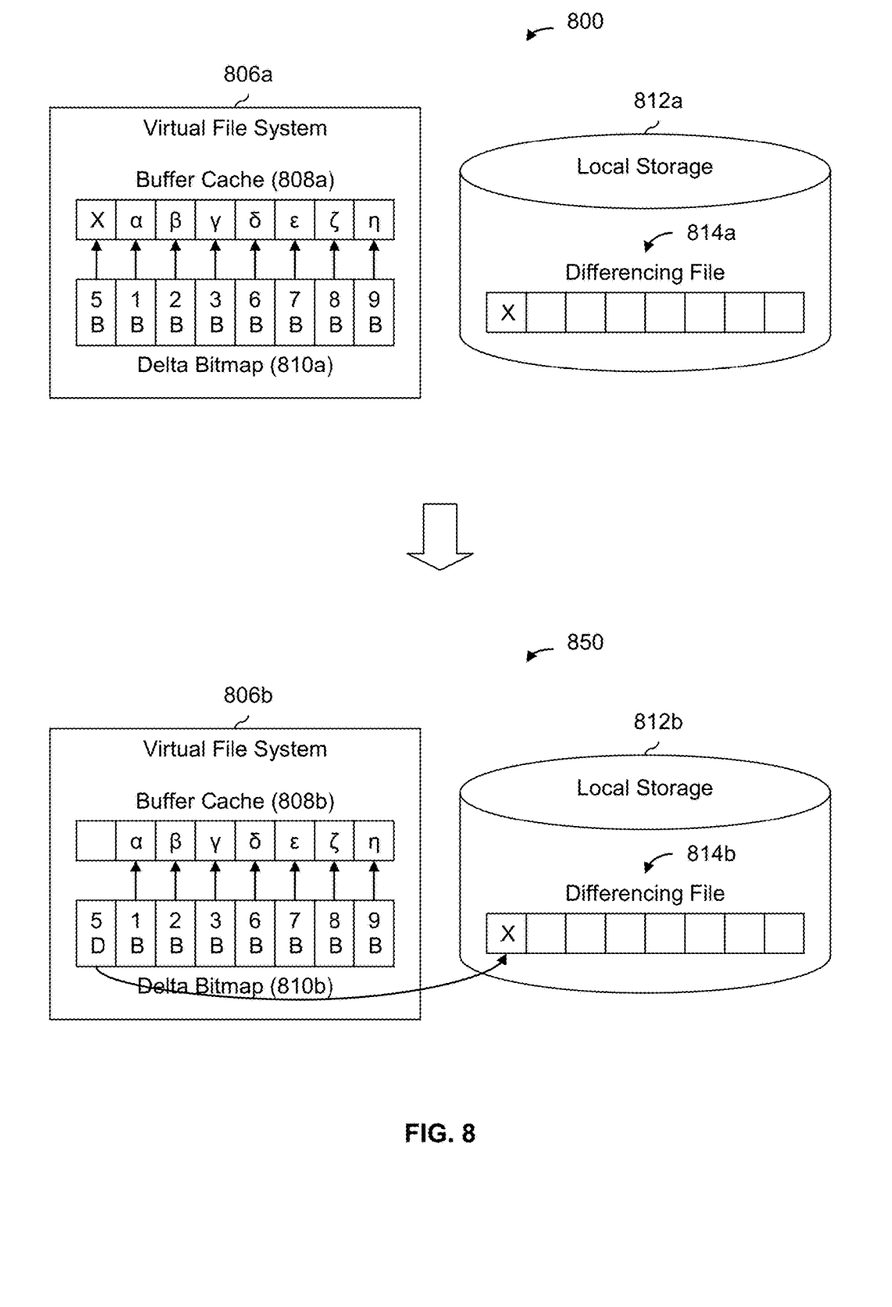
FIG. 8 is a diagram illustrating an embodiment of a virtual file system and local storage before and after an eviction process is performed.

FIG. 8 is a diagram illustrating an embodiment of a virtual file system and local storage before and after an eviction process is performed. In the example shown, the process of FIG. 7 is performed on the system shown in diagram 800. Before the eviction process is performed, buffer cache 808a in virtual file system 806a is full of changed data. In this particular example, the piece of changed data which has not been touched or accessed the longest is selected for eviction. In this example, that is data "X" in buffer cache 808a which corresponds to block 5 (e.g., in some original data on a remote device, not shown). Note that in this particular example, a copy of data "X" is already stored in differencing file 814a on local storage 812a.

Diagram 850 shows the system after the process of FIG. 7 is completed. After the eviction process, data "X" is no longer in buffer cache 808b and delta bitmap 810b has been updated with a stored value of "5D" which indicates that the data for block 5 should be obtained from differencing filed 814b. As described above, in some embodiments a delta bitmap is permitted to expand as much as needed, so delta bitmap 810b in diagram 850 being full is not necessarily a concern.

Figure 9:
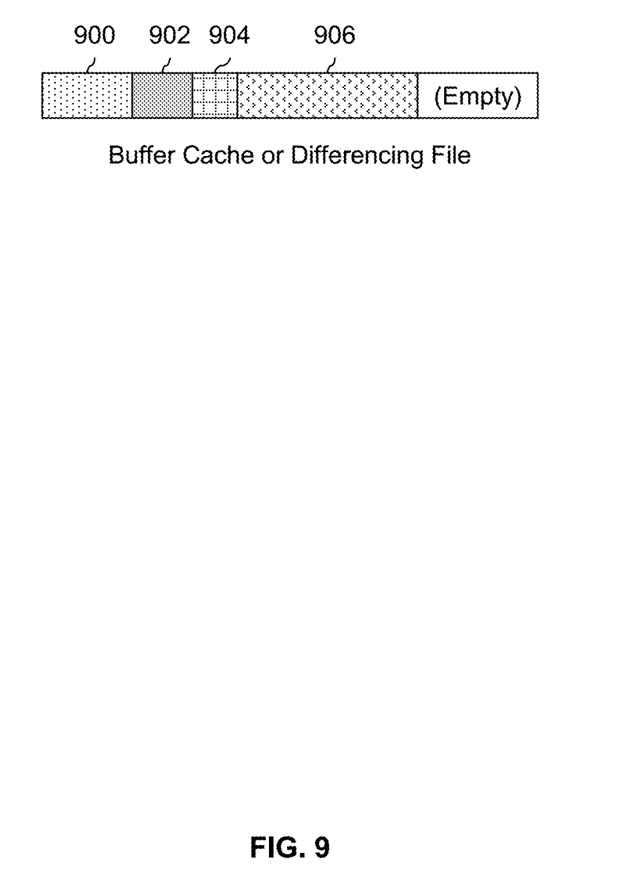
FIG. 9 is a diagram showing an embodiment of blocks having variable sizes.

FIG. 9 is a diagram showing an embodiment of blocks having variable sizes. In some embodiments, changed data in the form of blocks (e.g., stored in buffer cache 208 and/or differencing file 214 in FIG. 2) are implemented as shown. In this example, the changed data (i.e., blocks) are permitted to have variable lengths. In other words, none of the lengths of data 900, 902, 904, or 906 match. As shown herein, in some embodiments, blocks are not required to all have the same length or size. Similarly, in some embodiments, blocks are not required to have sizes or lengths with a common step size (e.g., it is not a requirement that the length of a block must be equal to k×μ, where k is an integer and μ is the step size).

In some applications, permitting variable block sizes is attractive because this enables the techniques described herein to be used with a variety of applications. For example, application 202 in FIG. 2 may comprise a variety of applications, each with its own set of design specifications and/or interface parameters. Although some application may be configured to input/output fixed-length blocks, not all applications are so constrained.

Another benefit to permitting variable block sizes is that a buffer cache can be more efficiently utilized. If blocks of a fixed length were required, then an entire block would have to be stored by the buffer cache, even if only a small change were made (e.g., which occupied only a fraction of the block). This is an inefficient packing of the buffer cache.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed causes the processor to:
  receive, via a virtual file system on a local device, a write instruction which affects original data, wherein the original data is read-only on a remote device and a corresponding version of the original data is writable on the local device;
  receive, from the remote device, the original data at the local device;
  apply the write instruction to the original data on the local device in order to obtain changed data;
  store, in a buffer in the virtual file system on the local device, the changed data;
  in response to storing the changed data in the buffer, record, in a bitmap in the virtual file system on the local device, that the changed data is stored in the buffer in the virtual file system on the local device; and
  copy, from the buffer to a differencing file in local storage on the local device, the changed data, wherein:
    deletion of the changed data from the buffer is dependent upon a degree of fullness associated with the buffer and is independent of completion of copying the changed data from the buffer to the differencing file where completion of copying does not automatically trigger deletion of the changed data from the buffer; and
    the bitmap in the virtual file system on the local device is updated to reflect that the changed data is stored in the differencing file, as opposed to the buffer, based on whether the changed data is deleted from the buffer and independent of completion of copying the changed data from the buffer to the differencing file.

2. The system recited in claim 1, wherein the memory is further configured to provide the processor with instructions which when executed causes the processor to:
receive, via the virtual file system, an access instruction;
determine that the access instruction is associated with the changed data which is stored in the buffer; and
obtain the changed data from the buffer.

3. The system recited in claim 2, wherein the access instruction includes one or more of the following: a read instruction or a second write instruction.

4. The system recited in claim 2, wherein the instructions for determining include instructions for:
obtaining a block number from the access instruction;
accessing the bitmap; and
finding, in the bitmap, an association between the block number and the changed data which is stored in the buffer.

5. The system recited in claim 2, wherein:
the access instruction includes a second write instruction which affects both the changed data stored in the buffer in the virtual file system and the changed data stored in the differencing file; and
the memory is further configured to provide the processor with instructions which when executed causes the processor to:
  apply the second write instruction to the changed data stored in the buffer in order to obtain further changed data;
  store, in the buffer, the further changed data; and
  copy, from the buffer to the differencing file, the further changed data.

6. The system recited in claim 1, wherein the bitmap is permitted to expand if more space is needed.

7. The system recited in claim 1, wherein the buffer is configured to store a plurality of changed data and the plurality of changed data is permitted to have variable lengths.

8. A method, comprising:
receiving, via a virtual file system on a local device, a write instruction which affects original data, wherein the original data is read-only on a remote device and a corresponding version of the original data is writable on the local device;

receiving, from the remote device, the original data at the local device;

using a processor to apply the write instruction to the original data on the local device in order to obtain changed data;

storing, in a buffer in the virtual file system on the local device, the changed data;

in response to storing the changed data in the buffer, recording, in a bitmap in the virtual file system on the local device, that the changed data is stored in the buffer in the virtual file system on the local device; and copying, from the buffer to a differencing file in local storage on the local device, the changed data, wherein:
deletion of the changed data from the buffer is dependent upon a degree of fullness associated with the buffer and is independent of completion of copying the changed data from the buffer to the differencing file where completion of copying does not automatically trigger deletion of the changed data from the buffer; and the bitmap in the virtual file system on the local device is updated to reflect that the changed data is stored in the differencing file, as opposed to the buffer, based on whether the changed data is deleted from the buffer and independent of completion of copying the changed data from the buffer to the differencing file.

9. The method recited in claim 8, further comprising:
receiving, via the virtual file system, an access instruction;
determining that the access instruction is associated with the changed data which is stored in the buffer; and
obtaining the changed data from the buffer.

10. The method recited in claim 9, wherein the access instruction includes one or more of the following: a read instruction or a second write instruction.

11. The method recited in claim 9, wherein determining includes:
obtaining a block number from the access instruction;
accessing the bitmap; and
finding, in the bitmap, an association between the block number and the changed data which is stored in the buffer.

12. The method recited in claim 9, wherein:
the access instruction includes a second write instruction which affects both the changed data stored in the buffer in the virtual file system and the changed data stored in the differencing file; and
the method further includes:
using the processor to apply the second write instruction to the changed data stored in the buffer in order to obtain further changed data;
storing, in the buffer, the further changed data; and
copying, from the buffer to the differencing file, the further changed data.

13. The method recited in claim 8, wherein the bitmap is permitted to expand if more space is needed.

14. The method recited in claim 8, wherein the buffer is configured to store a plurality of changed data and the plurality of changed data is permitted to have variable lengths.

15. A computer program product, the computer program product being embodied in a non-transitory computer readable storage medium and comprising computer instructions for:
receiving, via a virtual file system on a local device, a write instruction which affects original data, wherein the original data is read-only on a remote device and a corresponding version of the original data is writable on the local device;

receiving, from the remote device, the original data at the local device;

applying the write instruction to the original data on the local device in order to obtain changed data;

storing, in a buffer in the virtual file system on the local device, the changed data;

in response to storing the changed data in the buffer, recording, in a bitmap in the virtual file system on the local device, that the changed data is stored in the buffer in the virtual file system on the local device; and copying, from the buffer to a differencing file in local storage on the local device, the changed data, wherein:
deletion of the changed data from the buffer is dependent upon a degree of fullness associated with the buffer and is independent of completion of copying the changed data from the buffer to the differencing file where completion of copying does not automatically trigger deletion of the changed data from the buffer; and the bitmap in the virtual file system on the local device is updated to reflect that the changed data is stored in the differencing file, as opposed to the buffer, based on whether the changed data is deleted from the buffer and independent of completion of copying the changed data from the buffer to the differencing file.

16. The computer program product recited in claim 15, further comprising computer instructions for:
receiving, via the virtual file system, an access instruction;
determining that the access instruction is associated with the changed data which is stored in the buffer; and
obtaining the changed data from the buffer.

17. The computer program product recited in claim 16, wherein the computer instructions for determining include computer instructions for:
obtaining a block number from the access instruction;
accessing the bitmap; and
finding, in the bitmap, an association between the block number and the changed data which is stored in the buffer.

18. The computer program product recited in claim 16, wherein:
the access instruction includes a second write instruction which affects both the changed data stored in the buffer in the virtual file system and the changed data stored in the differencing file; and
the computer program product further includes computer instructions for:
applying the second write instruction to the changed data stored in the buffer in order to obtain further changed data;
storing, in the buffer, the further changed data; and
copying, from the buffer to the differencing file, the further changed data.

19. The computer program product recited in claim 15, wherein the bitmap is permitted to expand if more space is needed.

20. The system recited in claim 1, wherein the memory is further configured to provide the processor with instructions which when executed causes the processor to:
determine if the buffer in the virtual file system is getting full; and
in the event it is determined that the buffer in the virtual file system is getting full:

select, from a plurality of changed data, one or more changed data to delete from the buffer;

update the bitmap so that one or more portions associated with the selected changed data reference the differencing file instead of the buffer; and delete the selected changed data from the buffer.

21. The method recited in claim 8, further comprising:

determining if the buffer in the virtual file system is getting full; and in the event it is determined that the buffer in the virtual file system is getting full:

selecting, from a plurality of changed data, one or more changed data to delete from the buffer;

updating the bitmap so that one or more portions associated with the selected changed data reference the differencing file instead of the buffer; and deleting the selected changed data from the buffer.

22. The computer program product recited in claim 15, further comprising computer instructions for:

determining if the buffer in the virtual file system is getting full; and in the event it is determined that the buffer in the virtual file system is getting full:

selecting, from a plurality of changed data, one or more changed data to delete from the buffer;

updating the bitmap so that one or more portions associated with the selected changed data reference the differencing file instead of the buffer; and deleting the selected changed data from the buffer.

* * * * *